(12) United States Patent
Yamada et al.

(10) Patent No.: US 11,251,503 B2
(45) Date of Patent: Feb. 15, 2022

(54) BATTERY PACK

(71) Applicant: MAKITA CORPORATION, Anjo (JP)

(72) Inventors: Toru Yamada, Anjo (JP); Hideyuki Taga, Anjo (JP)

(73) Assignee: MAKITA CORPORATION, Tokyo (JP)

( * ) Notice: Subject to any disclaimer, the term of this patent is extended or adjusted under 35 U.S.C. 154(b) by 205 days.

(21) Appl. No.: 16/675,321

(22) Filed: Nov. 6, 2019

(65) Prior Publication Data

US 2020/0176746 A1 Jun. 4, 2020

(51) Int. Cl.
*H01M 50/502* (2021.01)
*H01M 50/213* (2021.01)

(52) U.S. Cl.
CPC ....... *H01M 50/502* (2021.01); *H01M 50/213* (2021.01); *H01M 2220/30* (2013.01)

(58) Field of Classification Search
CPC ............. H01M 50/502; H01M 50/213; H01M 2220/30; H01M 10/425; H01M 50/20; Y02E 60/10
See application file for complete search history.

(56) References Cited

U.S. PATENT DOCUMENTS

| 2011/0244274 | A1* | 10/2011 | Ogino | H01M 50/502 429/7 |
|---|---|---|---|---|
| 2012/0107651 | A1 | 5/2012 | Hotta et al. | |
| 2013/0136965 | A1* | 5/2013 | Nakano | H01M 10/48 429/92 |
| 2015/0044519 | A1* | 2/2015 | Rief | H01M 50/20 429/50 |
| 2015/0050532 | A1* | 2/2015 | Waigel | B25F 5/008 429/61 |
| 2015/0072211 | A1* | 3/2015 | Nakamura | H01M 50/502 429/121 |
| 2015/0194710 | A1* | 7/2015 | Naito | H01M 10/482 429/90 |
| 2015/0255225 | A1* | 9/2015 | Kusaba | H01G 11/76 429/120 |
| 2016/0036030 | A1* | 2/2016 | Frias | H01M 50/20 429/121 |
| 2016/0099448 | A1* | 4/2016 | Ikeda | B60L 3/0046 429/176 |
| 2016/0260950 | A1* | 9/2016 | Baek | H01M 50/502 |
| 2017/0025717 | A1* | 1/2017 | Zeller | H01M 10/054 |

FOREIGN PATENT DOCUMENTS

| JP | 2012-099307 A | 5/2012 |
|---|---|---|
| JP | 6227420 B2 | 11/2017 |

* cited by examiner

*Primary Examiner* — Michael L Dignan
(74) *Attorney, Agent, or Firm* — Oliff PLC

(57) ABSTRACT

A plurality of battery cells of a battery pack may include at least one first battery cell arranged in a first row, at least one second battery cell arranged in a second row adjacent to the first row, at least one third battery cell arranged in a third row adjacent to the second row, and at least one fourth battery cell arranged in a fourth row adjacent to the third row. The at least one first battery cell and the at least one second battery cell are connected in series. Each of the at least one first battery cell is connected in parallel with a corresponding one of the at least one third battery cell. Each of the at least one second battery cell is connected in parallel with a corresponding one of the at least one fourth battery cell.

20 Claims, 10 Drawing Sheets

BATTERY PACK

CROSS-REFERENCE TO RELATED APPLICATION

This application claims priority to Japanese Patent Application No. 2018-225403, filed on Nov. 30, 2018 the entire contents of which are incorporated herein by reference.

TECHNICAL FIELD

The art disclosed herein relates to a battery pack used in electrical equipment such as a power tool.

BACKGROUND

Japanese Patent Application Publication No. 2012-99307 describes a battery pack. This battery pack includes a plurality of battery cells supported parallel to each other and a plurality of lead plates that electrically connects the plurality of battery cells. Each of the battery cells is connected in parallel with at least one battery cell and is connected in series with other battery cells.

SUMMARY

Typically, a plurality of battery cells is arranged in proximity to each other to reduce a size of a battery pack. When two battery cells connected in parallel are arranged adjacent to each other in such a plurality of battery cells, when a short circuit occurs in one of the battery cells, the other healthy battery cell could be damaged. That is, when a short circuit occurs in one of the battery cells, the other battery cell is also short circuited through this failed battery cell. As a result, when a short circuit occurs in one of the battery cells, large current flows in both of the two battery cells connected in parallel. In such a condition, when those two battery cells are arranged adjacent to each other, the healthy battery is heated not only by heat which the healthy battery itself generated but also by heat transmitted from the short-circuited battery cell. As a result, the healthy battery pack could be damaged due to its temperature rising excessively. The description herein provides an art that at least partially solves such a problem.

A battery pack disclosed herein may comprise a plurality of battery cells supported parallel to each other and a plurality of lead plates electrically connecting the plurality of battery cells. Each battery cell comprises a first end facing a first plane and a second end facing a second plane parallel to the first plane. The plurality of lead plate includes at least one first lead plate arranged along the first plane and at least one second lead plate arranged along the second plane. The plurality of battery cells includes at least one first battery cell arranged in a first row, at least one second battery cell arranged in a second row adjacent to the first row, at least one third battery cell arranged in a third row adjacent to the second row, and at least one fourth battery cell arranged in a fourth row adjacent to the third row. The at least one first battery cell and the at least one second battery cell are connected in series. Each of the at least one first battery cell is connected in parallel with corresponding one of the at least one third battery cell, and each of the at least one second battery cell is connected in parallel with corresponding one of the at least one fourth battery cell.

According to the aforementioned configuration, any two battery cells connected in parallel with each other can be prohibited from being arranged adjacent to each other. Due to this, when a short circuit occurs in one of the battery cells, the battery cell correspondingly connected in parallel with this battery cell can be suppressed from being damaged.

DETAILED DESCRIPTION

Figure 1:
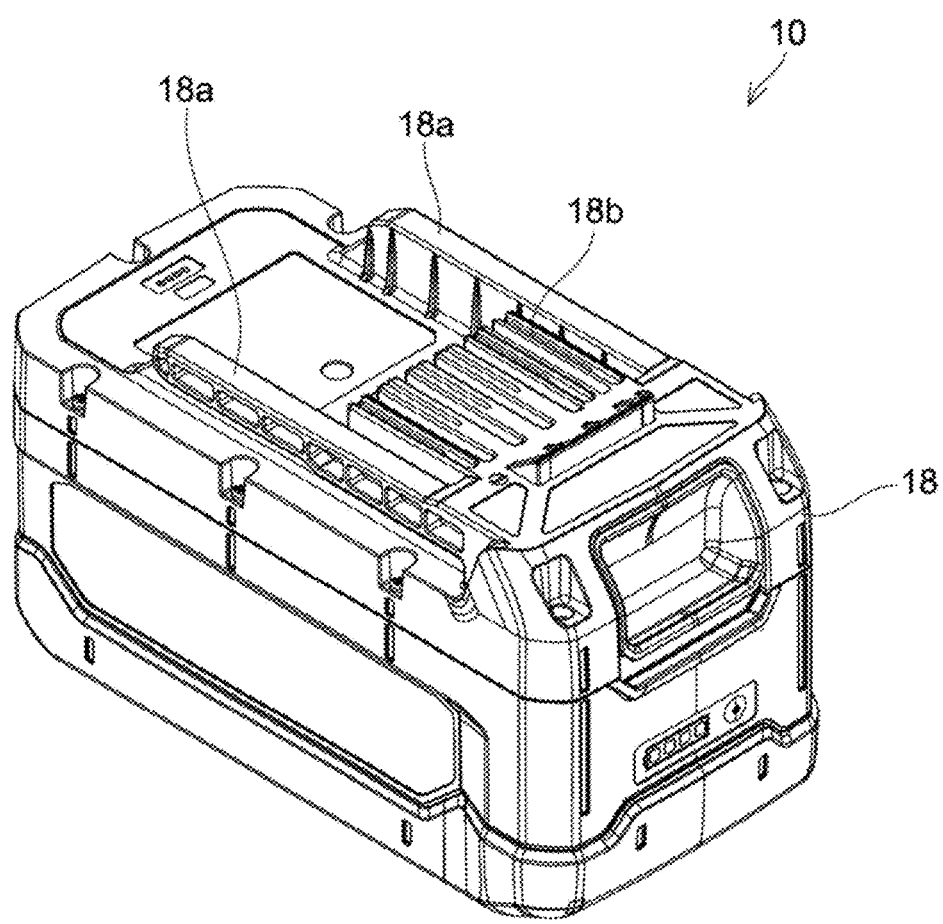
FIG. 1 is a perspective view of an outer appearance of a battery pack 10 of a first embodiment.

In an embodiment of the art disclosed herein, at least one first battery cell may include a plurality of first battery cells arranged in a first row, and at least one third battery cell may include a plurality of third battery cells arranged in a third row.

In addition to the above or as an alternative thereof, at least one second battery cell may include a plurality of second battery cells arranged in a second row, and at least one fourth battery cell may include a plurality of fourth battery cells arranged in a fourth row.

In an embodiment of the art disclosed herein, the plurality of first battery cells and the plurality of second battery cells may be connected in series to each other in one-by-one pairs. However, as another embodiment, the plurality of first battery cells and the plurality of second battery cells may be connected in series to each other in two-by-two pairs or in pairs with each pair including larger numbers of the first batteries and the second batteries. In a circuit structure in which the plurality of first battery cells and the plurality of second battery cells are connected in series, a positional relationship of the first battery cells and the second battery cells (that is, orders of arrangement thereof) may suitably be designed.

In an embodiment of the art disclosed herein, each of the plurality of first battery cells and the plurality of third battery cells may comprise a positive electrode at its first end and a negative electrode at its second end. That is, the plurality of first battery cells and the plurality of third battery cells may be oriented in a same direction as each other. In addition, each of the plurality of second battery cells and the plurality of fourth battery cells may comprise a negative electrode at its first end and a positive electrode at its second end. That is, the plurality of second battery cells and the plurality of fourth battery cells may be oriented in a same direction as each other and oriented in a different direction from the plurality of first battery cells and the plurality of third battery cells.

In the aforementioned embodiments, a plurality of first lead plates may include one or more first multi-row lead plates. In this case, each first multi-row lead plate may be connected to the positive electrode of one of the plurality of first battery cells, the negative electrode of one of the plurality of second battery cells, the positive electrode of one of the plurality of third battery cells, and the negative electrode of one of the plurality of fourth battery cells.

In the aforementioned embodiment, the plurality of first multi-row lead plates may be arranged in a direction parallel to the first row. Such a configuration can prevent two or more first multi-row lead plates from intersecting each other.

In the aforementioned embodiments, the plurality of first multi-row lead plates may have a same shape and may be arranged in a same posture as each other. Such a configuration can facilitate a structure of the battery pack is simplified, and design and manufacture thereof.

In an embodiment of the art disclosed herein, a part of or all of configurations of the aforementioned plurality of first lead plates may be employed similarly to a plurality of second lead plates. That is, the plurality of second lead plates may include one or more second multi-row lead plates. In this case, each second multi-row lead plate may be connected to the negative electrode of one of the plurality of first battery cells, the positive electrode of one of the plurality of second battery cells, the negative electrode of one of the plurality of third battery cells, and the positive electrode of one of the plurality of fourth battery cells.

In the aforementioned embodiments, the plurality of second multi-row lead plates may be arranged in the direction parallel to the first row. Such a configuration can prevent two or more second multi-row lead plates from intersecting each other.

In the aforementioned embodiments, the plurality of second multi-row lead plates may have a same shape and may be arranged in a same posture as each other. Such a configuration can simplify the structure of the battery pack and facilitate the design and manufacture thereof.

In the aforementioned embodiments, the shape of the second multi-row lead plate(s) may be different from the shape of the first multi-row lead plate(s). That is, the shape of the first multi-row lead plate(s) and the shape of the second multi-row lead plate(s) may be designed independently of each other.

In an embodiment of the art disclosed herein, the plurality of battery cells may be arranged in a staggered arrangement. For example, when the first battery cells in the first row are moved vertically toward the second row, the first battery cells and the second battery cells may not overlap completely, and may slightly be offset from each other. The same may apply to a positional relationship between the second battery cells and the third battery cells as well as to a positional relationship between the third battery cells and the fourth battery cells. On the other hand, when the first battery cells in the first row are moved vertically toward the third row, the first battery cells and the third battery cells may overlap completely, or may slightly be offset from each other.

In an embodiment of the art disclosed herein, the plurality of first battery cells and the plurality of second battery cells may be connected in series to each other in two-by-two pairs. That is, for example, they may be connected in series in an order of the first battery cell, the first battery cell, the second battery cell, the second battery cell, the first battery cell, the first battery cell, and so on.

In an embodiment of the art disclosed herein, the plurality of first battery cells may be alternately oriented in opposite directions in the first row, and the plurality of third battery cells may be alternately oriented in opposite directions in the third row. In addition or as an alternative thereto, the plurality of second battery cells may be alternately oriented in opposite directions in the second row, and the plurality of fourth battery cells may be alternately oriented in opposite directions in the fourth row.

In an embodiment of the art disclosed herein, the at least one first lead plate may include a lead plate connected to the first ends of adjacent two of the plurality of first battery cells and to the first ends of adjacent two of the plurality of third battery cells. In addition or as an alternative thereto, the at least one first lead plate may include a lead plate connected to the first ends of adjacent two of the plurality of second battery cells and to the first ends of adjacent two of the plurality of fourth battery cells.

In addition to the above, the at least one second lead plate may include a lead plate connected to one of the plurality of first battery cells, one of the plurality of second battery cells, one of the plurality of third battery cells, and one of the plurality of fourth battery cells.

In an embodiment of the art disclosed herein, the battery pack may comprise a battery holder securing the plurality of battery cells, the at least one first lead plate, and the at least one second lead plate to each other. In addition, the battery pack may further comprise a housing accommodating the battery holder. Specific configurations of the battery holder and the housing are not particularly limited.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved battery packs, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

Figure 2:
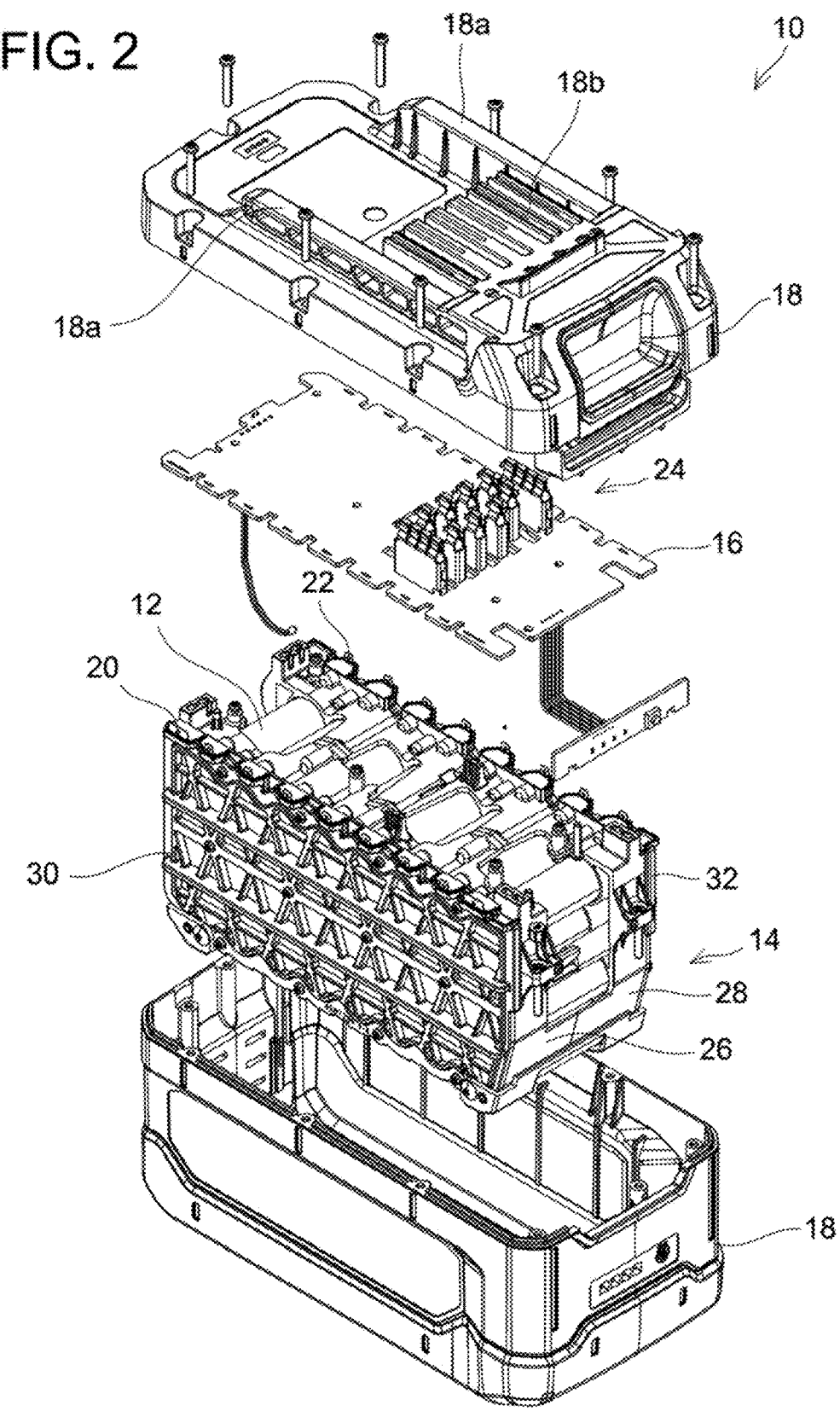
FIG. 2 is a disassembled view of the battery pack 10.

A battery pack 10 of a first embodiment will be described with reference to the drawings. The battery pack 10 of the present embodiment is a rechargeable electric power storage device, and is detachably attached to electrical equipment such as a power tool (not shown) as a power source configured to supply power to the electrical equipment. As shown in FIGS. 1 and 2, the battery pack 10 includes a plurality of battery cells 12, a battery holder 14 that retains the plurality of battery cells 12, and a circuit board 16 secured to the battery holder 14 and electrically connected to the plurality of battery cells 12. Further, the battery pack 10 includes a housing 18 that accommodates the plurality of battery cells 12, the battery holder 14, and the circuit board 16.

The plurality of battery cells 12 is retained parallel to each other by the battery holder 14. Each of the battery cells 12 is a rechargeable battery cell. Although this is merely an example, each of the battery cells 12 in this embodiment is a lithium ion battery cell, and has a nominal voltage of substantially 4 volts. Further, a total number of the plurality of battery cells 12 is thirty-two, and sixteen pairs of battery cells 12 are connected in series with two battery cells 12 connected in parallel with each other constituting each pair. Due to this, the battery pack 10 has a nominal voltage of substantially 64 volts.

The battery holder 14 is constituted of an insulative material (such as a resin material). Although details will be given later, the battery holder 14 has a plurality of first lead plates 20 and a plurality of second lead plates 22 incorporated therein. The plurality of first lead plates 20 is arranged on one sidewall of the battery holder 14, and the plurality of second lead plates 22 is arranged on another sidewall of the battery holder 14. The plurality of battery cells 12 is electrically connected to each other through the plurality of first lead plates 20 and the plurality of second lead plates 22. Further, each of the first lead plates 20 and each of the second lead plates 22 are electrically connected to the circuit board 16.

The circuit board 16 is electrically connected to the plurality of battery cells 12 through the plurality of first lead plates 20 and the plurality of second lead plates 22. The circuit board 16 is configured capable of detecting a voltage of each first lead plate 20 and a voltage of each second lead plate 22, by which voltages of the respective battery cells 12 can be identified. In addition, the circuit board 16 includes a plurality of external connection terminals 24 for connecting to the electrical equipment. The plurality of external connection terminals 24 includes a pair of power terminals and several communication terminals. The pair of power terminals is electrically connected to the plurality of battery cells 12 and is configured to output discharged power from the plurality of battery cells 12 to the electrical equipment. Further, the pair of power terminals is configured to electrically connect to a charger (not shown), and is configured to receive charging power from the charger to the plurality of battery cells 12. The communication terminals are connected to a processor (not shown) provided in the circuit board 16.

The housing 18 has a substantially rectangular solid outer shape, and is constituted of a resin material. An engagement structure 18a for engaging with the electrical equipment and a plurality of openings 18b (such as slits) configured to accept connection terminals of the electrical equipment are provided on an upper surface of the housing 18. The plurality of external connection terminals 24 on the circuit board 16 is respectively arranged inside the plurality of openings 18b. A configuration of the housing 18 described herein is an example, and a specific configuration of the housing 18 can suitably be modified.

Figure 3:
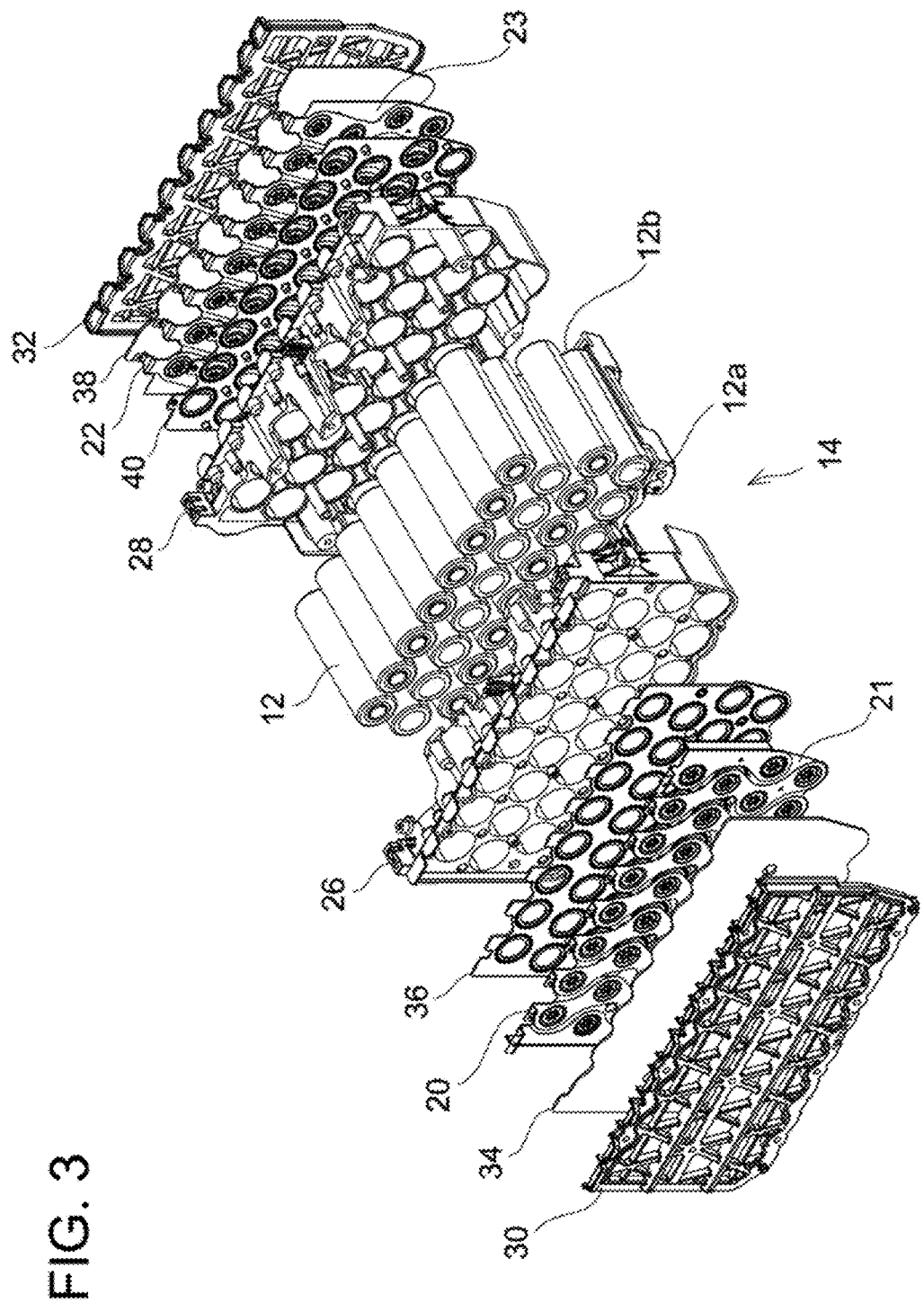
FIG. 3 is a disassembled view of a battery holder 14.

Next, a structure of the battery holder 14 will be described with reference to FIG. 3. The battery holder 14 includes a first holder body 26 and a second holder body 28. The first holder body 26 and the second holder body 28 are secured to each other with the plurality of battery cells 12 interposed in between them, and retain the plurality of battery cells 12 parallel to each other. The battery holder 14 is further provided with a first holder cover 30 and a second holder cover 32. The first holder cover 30 is attached to the first holder body 26 with the plurality of first lead plates 20 interposed in between them, and secure the plurality of first lead plates 20 relative to the first holder body 26 (that is, relative to the plurality of battery cells 12). The second holder cover 32 is attached to the second holder body 28 with the plurality of second lead plates 22 interposed in between them, and secure the plurality of second lead plates 22 relative to the second holder body 28 (that is, relative to the plurality of battery cells 12).

A first outer waterproof sheet 34 is provided between the first holder cover 30 and the plurality of first lead plates 20 and a first inner waterproof sheet 36 is provided between the plurality of first lead plates 20 and the first holder body 26. The first outer waterproof sheet 34 and the first inner waterproof sheet 36 are constituted of silicone rubber, and are configured to suppress moisture and small foreign particles from entering. The plurality of first lead plates 20 is integrally retained between a pair of films 21 by laminating. Similarly, a second outer waterproof sheet 38 is provided between the second holder cover 32 and the plurality of second lead plates 22 and a second inner waterproof sheet 40 is provided between the plurality of second lead plates 22 and the second holder body 28. The second outer waterproof sheet 38 and the second inner waterproof sheet 40 are also constituted of silicone rubber, and are configured to suppress moisture and small foreign particles from entering. The plurality of second lead plates 22 is also integrally retained between a pair of films 23 by laminating. Each of the waterproof sheets 34, 36, 38, 40 is not limited to silicone rubber, and may be constituted of other flexible material having waterproof capability such as elastomer and other polymer materials.

Figure 4:
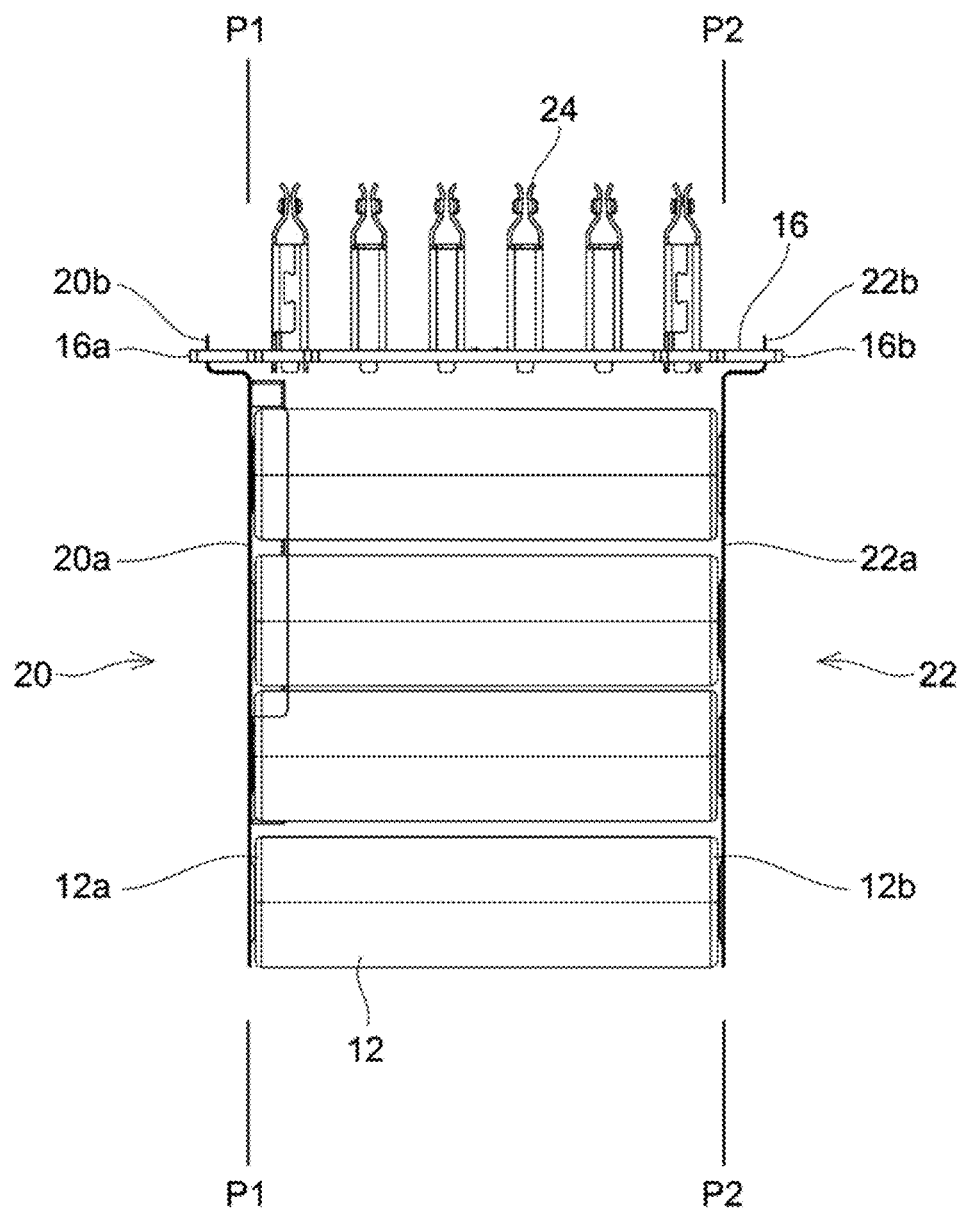
FIG. 4 is a front view showing a positional relationship of a plurality of battery cells 12, a plurality of lead plates 20, 22, and a circuit board 16. Depiction of the battery holder 14 is omitted in FIGS. 4 to 7.
Figure 5:
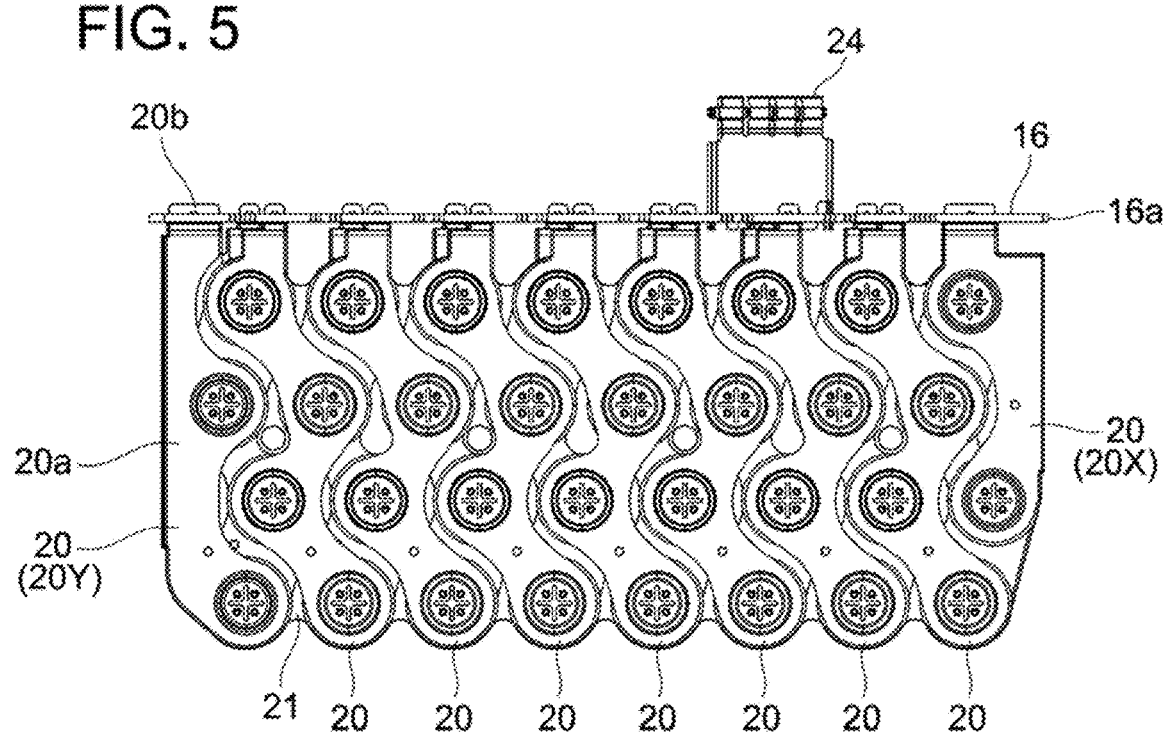
FIG. 5 is a left-side view showing the positional relationship of the plurality of battery cells 12, the plurality of lead plates 20, 22, and the circuit board 16.
Figure 6:
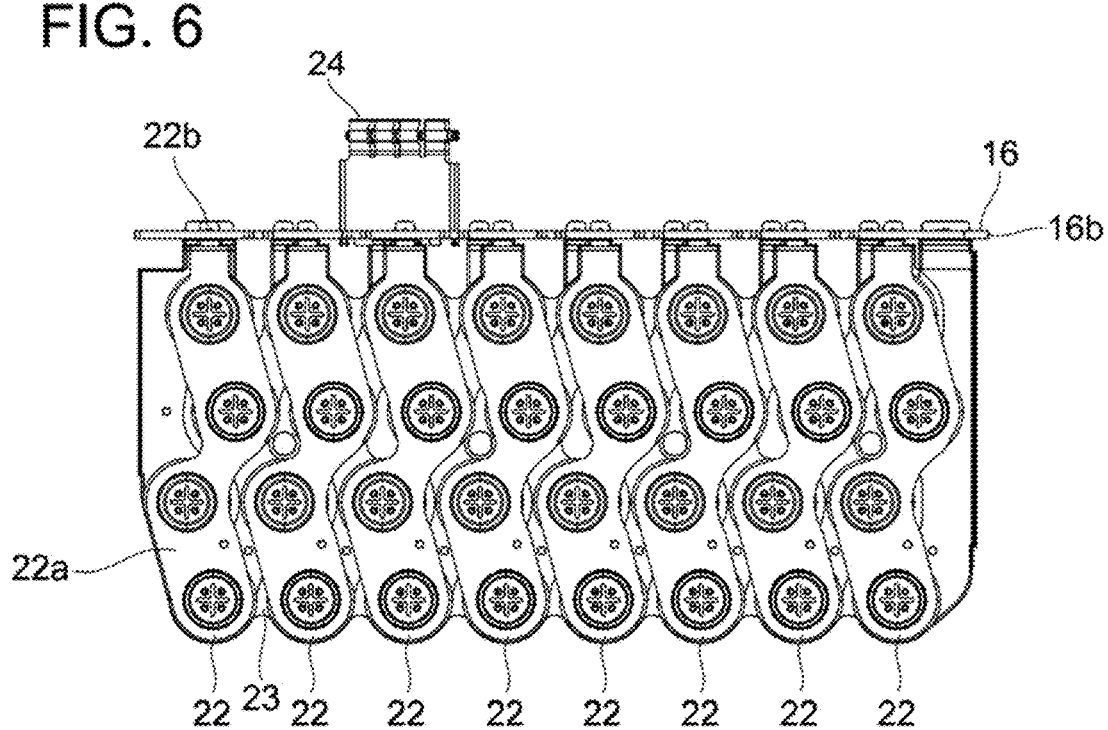
FIG. 6 is a right-side view showing the positional relationship of the plurality of battery cells 12, the plurality of lead plates 20, 22, and the circuit board 16.

Next, the plurality of first lead plates 20 and the plurality of second lead plates 22 will be described in detail. In FIGS. 4 to 6, depiction of the battery holder 14 is omitted. As shown in FIGS. 4 to 6, the plurality of first lead plates 20 is arranged along a first plane P1 and the plurality of second lead plates 22 is arranged along a second plane P2. Further, each of the plurality of battery cells 12 includes a first end 12a facing the first plane P1 and a second end 12b facing the second plane P2 parallel to the first plane P1. Orientations of the plurality of battery cells 12 are not identical. That is, some battery cells 12 have positive electrodes at their first ends 12a and negative electrodes at their second ends 12b, and other battery cells 12 have negative electrodes at their first ends 12a and positive electrodes at their second ends 12b.

Each of the first lead plates 20 includes a first main portion 20*a* positioned along the first plane P1 and a first terminal portion 20*b* connected to the circuit board 16. The first main portion 20*a* is connected to the first end 12*a* of at least one of the plurality of battery cells 12 (that is, the positive electrode or the negative electrode). Although there is no particular limitation, in the present embodiment, the first main portion 20*a* is connected to the first end 12*a* of at least one of the plurality of battery cells 12 by spot welding (resistance welding). On the other hand, the first terminal portion 20*b* is connected to the circuit board 16 by soldering.

Similarly, each of the second lead plates 22 includes a second main portion 22*a* positioned along the second plane P2 and a second terminal portion 22*b* connected to the circuit board 16. The second main portion 22*a* is connected to the second end 12*b* of at least one of the plurality of battery cells 12 (that is, the positive electrode or the negative electrode). Although there is no particular limitation, in the present embodiment, the second main portion 22*a* is connected to the second end 12*b* of at least one of the plurality of battery cells 12 by spot welding (resistance welding). On the other hand, the second terminal portion 22*b* is connected to the circuit board 16 by soldering.

Figure 7:
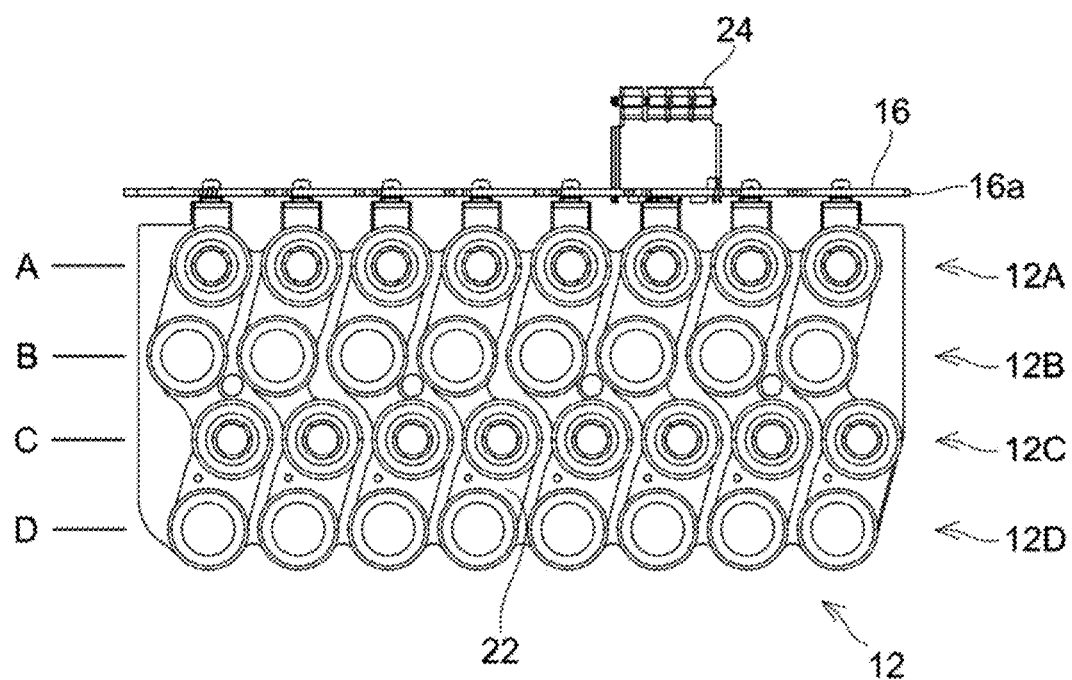
FIG. 7 is a view with the plurality of lead plates 20 removed from the left-side view of FIG. 5.
Figure 8:
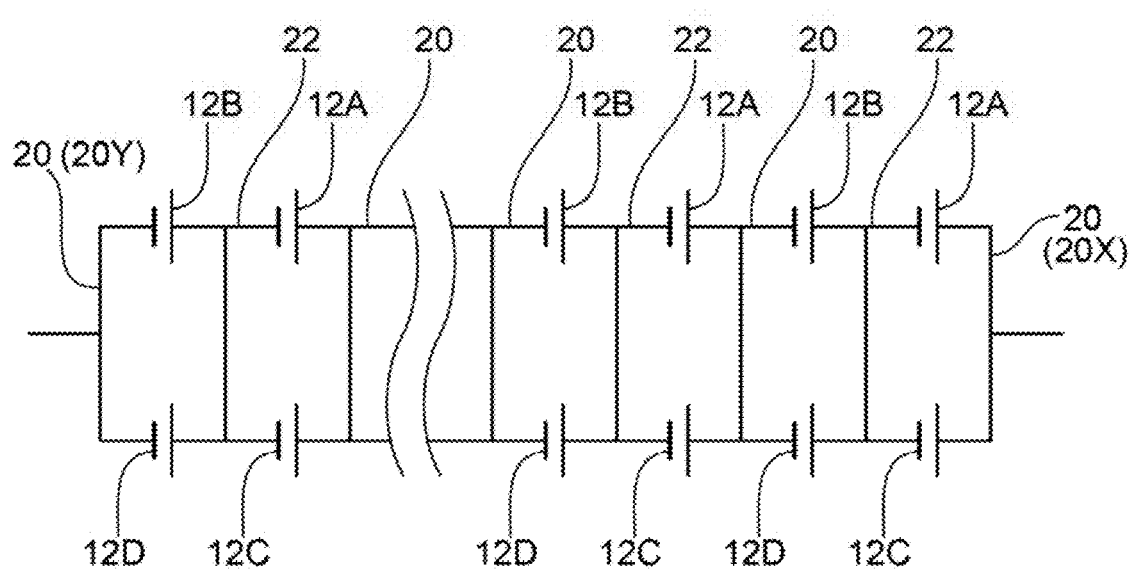
FIG. 8 is a circuit diagram showing an electrical connection configuration of the plurality of battery cells 12.

As shown in FIGS. 7 and 8, the plurality of battery cells 12 includes a plurality of first battery cells 12A arranged in a first row A, a plurality of second battery cells 12B arranged in a second row B adjacent to the first row A, a plurality of third battery cells 12C arranged in a third row C adjacent to the second row B, and a plurality of fourth battery cells 12D arranged in a fourth row D adjacent to the third row C. Although there is no particular limitation, numbers of the first battery cells 12A, the second battery cells 12B, the third battery cells 12C, and the fourth battery cells 12D are identical to each other, and the numbers thereof are eight each. Further, the first row A to the fourth row D are parallel to each other, and center axes of the battery cells 12 are positioned on a same plane in each of the first row A to the fourth row D.

The plurality of first battery cells 12A and the plurality of second battery cells 12B are connected in series to each other in one-by-one pairs. Especially, two first battery cells 12A adjacent to each other are connected in series through one second battery cell 12B located closest thereto. Further, each of the plurality of first battery cells 12A has corresponding one of the plurality of third battery cells 12C connected thereto in parallel. Further, each of the plurality of second battery cells 12B has corresponding one of the plurality of fourth battery cells 12D connected thereto in parallel. As such, the plurality of third battery cells 12C and the plurality of fourth battery cells 12D are also alternately connected in series. Further, two third battery cells 12C adjacent to each other are connected in series through one fourth battery cell 12D located closest thereto.

The aforementioned configuration can prohibit any pairs of two battery cells 12 connected in parallel with each other from becoming adjacent to each other. For example, each of the first battery cells 12A is connected in parallel with corresponding one of the third battery cells 12C instead of the second battery cell 12B that is adjacent thereto. Similarly, each of the second battery cells 12B is connected in parallel with corresponding one of the fourth battery cells 12D instead of the first battery cell 12A or the third battery cell 12C adjacent thereto. Due to this, when a short circuit occurs in one of the battery cells 12, a corresponding battery cell 12 connected in parallel with this battery cell 12 is suppressed from being collaterally damaged.

In the battery pack 10 of the present embodiment, the plurality of first battery cells 12A and the plurality of third battery cells 12C have the positive electrodes at their first ends 12*a* and the negative electrodes at their second ends 12*b*. That is, the plurality of first battery cells 12A and the plurality of third battery cells 12C are arranged in a same orientation as each other. In addition, the plurality of second battery cells 12B and the plurality of fourth battery cells 12D have the negative electrodes at their first ends 12*a* and the positive electrodes at their second ends 12*b*. That is, the plurality of second battery cells 12B and the plurality of fourth battery cells 12D are oriented in a same direction as each other, and oriented in a different direction from that of the plurality of first battery cells 12A and the plurality of third battery cells 12C.

In the battery pack 10 of the present embodiment, a first multi-row lead plate is employed as each of the first lead plates 20 except for the first lead plates 20 (20X, 20Y) located at both ends (see FIG. 5). Each of the first multi-row lead plates 20 extends over the first row A to the fourth row D, and is connected to the positive electrode of one of the plurality of first battery cells 12A, the negative electrode of one of the plurality of second battery cells 12B, the positive electrode of one of the plurality of third battery cells 12C, and the negative electrode of one of the plurality of fourth battery cells 12D.

The plurality of first multi-row lead plates 20 is arranged in a direction parallel to the first row A. This avoids two or more first multi-row lead plates 20 from becoming closer to or crossing over each other. Although there is no particular limitation, the plurality of first multi-row lead plates 20 may have a same shape as each other and be arranged in a same posture. Such a configuration simplifies the structure of the battery pack 10, and can facilitate design and manufacture thereof. Specific shapes of the first multi-row lead plates 20 may suitably be designed according to an arrangement of the plurality of battery cells 12, for example.

In the battery pack 10 of the present embodiment, a second multi-row lead plate is employed as each of the second lead plates 22 (see FIG. 6). Each of the second multi-row lead plates 22 extends over the first row A to the fourth row D, and is connected to the negative electrode of one of the plurality of first battery cells 12A, the positive electrode of one of the plurality of second battery cells 12B, the negative electrode of one of the plurality of third battery cells 12C, and the positive electrode of one of the plurality of fourth battery cells 12D.

The plurality of second multi-row lead plates 22 is arranged in the direction parallel to the first row A. This avoids two or more second multi-row lead plates 22 from becoming closer to or crossing over each other. Although there is no particular limitation, the plurality of second multi-row lead plates 22 may have a same shape as each other and be arranged in a same posture. Such a configuration simplifies the structure of the battery pack 10, and can facilitate design and manufacture thereof. Specific shapes of the second multi-row lead plates 22 may suitably be designed according to the arrangement of the plurality of battery cells 12, for example. Although this is merely an example, the second multi-row lead plates 22 in the present embodiment have a shape that differs from those of the first multi-row lead plates 20.

In the battery pack 10 of the present embodiment, the plurality of battery cells 12 is arranged in a staggered arrangement. For example, when the first battery cells 12A in the first row A are moved vertically toward the second row B, the first battery cells 12A and the second battery cells 12B do not overlap completely. The same applies to a positional relationship between the second battery cells 12B and the third battery cells 12C as well as to a positional relationship between the third battery cells 12C and the fourth battery cells 12D. In addition, although there is no particular limitation made hereto, when the first battery cells 12A in the first row A are moved vertically to the third row C, the first battery cells 12A and the third battery cells 12C do not overlap completely. Further, when the second battery cells 12B in the second row B are moved vertically to the fourth row D, the second battery cells 12B and the fourth battery cells 12D do not overlap completely. Further, the arrangement of the plurality of battery cells 12 is not particularly limited. The plurality of battery cells 12 may be arranged in contact with each other, or may be arranged with clearances in between them.

A battery pack 110 of a second embodiment will be described with reference to FIGS. 9 and 10. Here, of a configuration of the battery pack 110 of the present embodiment, differences from the battery pack 10 of the first embodiment will primarily be explained. Unless otherwise stated in the description below, the respective configurations provided in the battery pack 10 of the first embodiment can selectively be employed in the battery pack 110 of the present embodiment.

Figure 9:
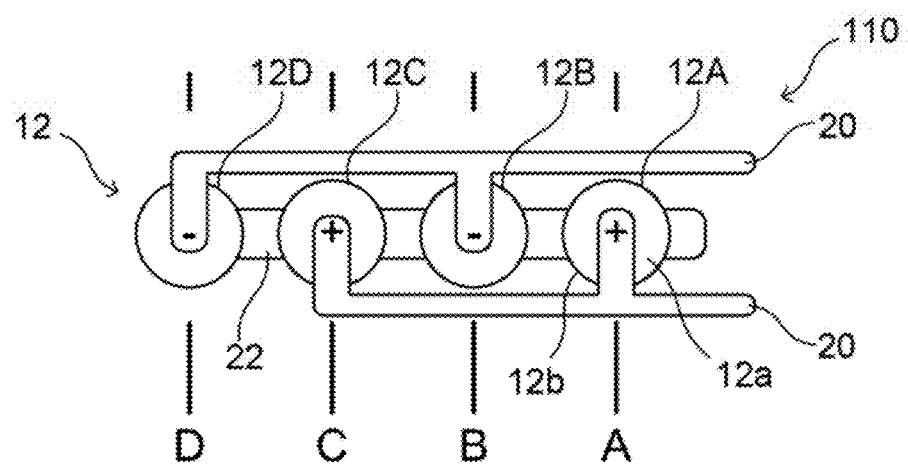
FIG. 9 schematically shows a configuration of a battery pack 110 of a second embodiment.
Figure 10:
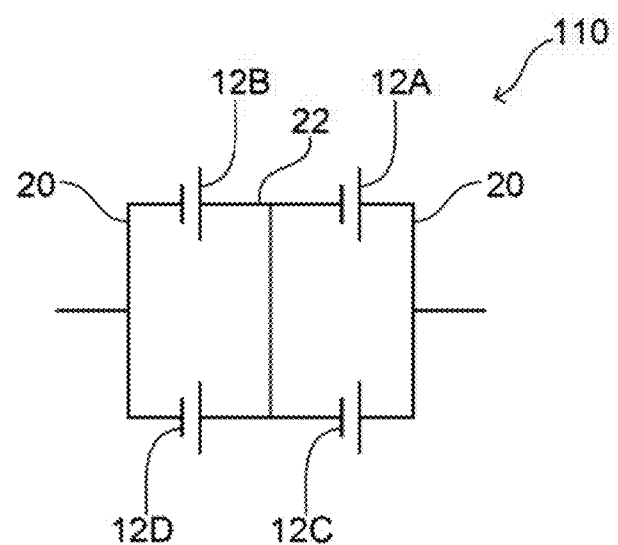
FIG. 10 is a circuit diagram showing an electrical connection configuration of a plurality of battery cells 12 of the battery pack 110 of the second embodiment.

As shown in FIGS. 9 and 10, the battery pack 110 of the present embodiment includes four battery cells 12. The four battery cells 12 are supported parallel to each other, and each has a first end 12a facing a first plane and a second end 12b facing a second plane parallel to the first plane. Further, the battery pack 110 includes two first lead plates 20 arranged along the first plane and one second lead plate 22 arranged along the second plane. These plural lead plates 20, 22 electrically connect the four battery cells 12.

The four battery cells 12 include a single first battery cell 12A arranged in a first row A, a single second battery cell 12B arranged in a second row B adjacent to the first row A, a single third battery cell 12C arranged in a third row C adjacent to the second row B, and a single fourth battery cell 12D arranged in a fourth row D adjacent to the third row C. The first battery cell 12A and the second battery cell 12B are connected in series. Further, the first battery cell 12A has the third battery cell 12C connected thereto in parallel, and the second battery cell 12B has the fourth battery cell 12D connected thereto in parallel. The second lead plate 22 has a structure of a second multi-row lead plate, and is connected to the negative electrode of the first battery cell 12A, the positive electrode of the second battery cell 12B, the negative electrode of the third battery cell 12C, and the positive electrode of the fourth battery cell 12D.

In the battery pack 110 of the second embodiment as well, any pairs of two battery cells 12 connected in parallel with each other are avoided from becoming adjacent to each other. For example, the first battery cell 12A is connected in parallel with the third battery cell 12C instead of the second battery cell 12B that is adjacent thereto. Similarly, the second battery cell 12B is connected in parallel with the fourth battery cell 12D instead of the first battery cell 12A or the third battery cell 12C adjacent thereto. Due to this, when a short circuit occurs in one of the battery cells 12, corresponding battery cell 12 connected in parallel with this battery cell 12 is suppressed from being collaterally damaged.

A battery pack 210 of a third embodiment will be described with reference to FIGS. 11 and 12. Here, of a configuration of the battery pack 210 of the present embodiment, differences from the battery pack 10 of the first embodiment will primarily be explained. Unless otherwise stated in the description below, the respective configurations provided in the battery pack 10 of the first embodiment can selectively be employed in the battery pack 210 of the present embodiment.

Figure 11:
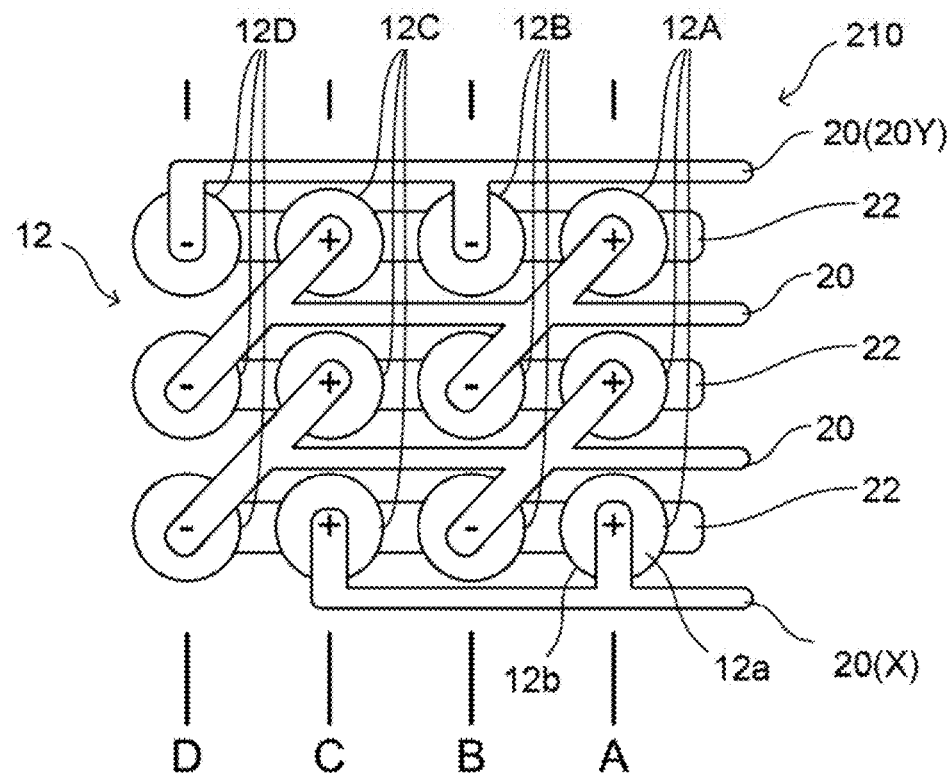
FIG. 11 schematically shows a configuration of a battery pack 210 of a third embodiment.
Figure 12:
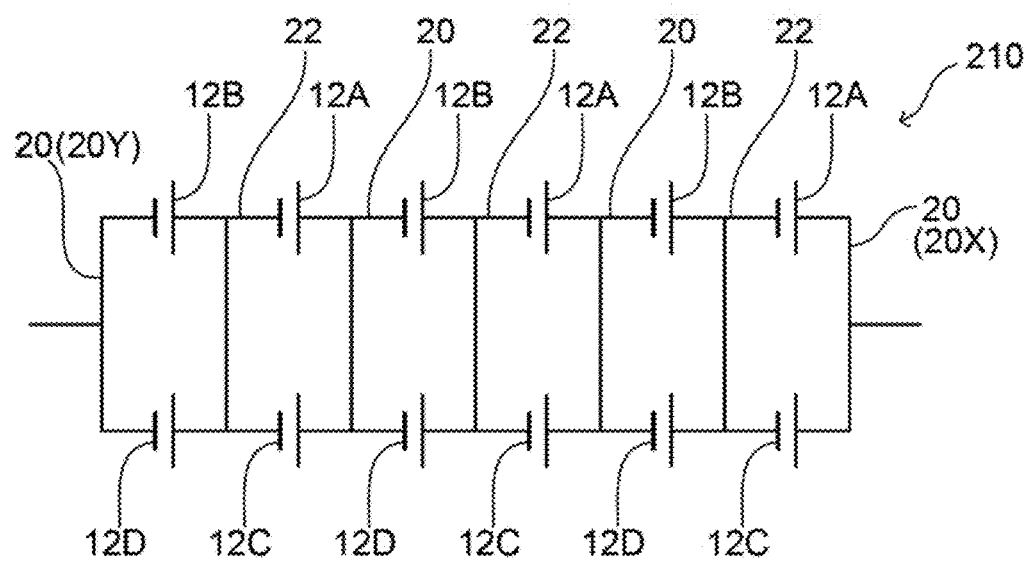
FIG. 12 is a circuit diagram showing an electrical connection configuration of a plurality of battery cells 12 of the battery pack 210 of the third embodiment.

As shown in FIGS. 11 and 12, the battery pack 210 of the present embodiment includes a plurality of battery cells 12. The plurality of battery cells 12 is supported parallel to each other, and each has a first end 12a facing a first plane and a second end 12b facing a second plane parallel to the first plane. Further, the battery pack 210 includes a plurality of first lead plates 20 arranged along the first plane and a plurality of second lead plates 22 arranged along the second plane. These plural lead plates 20, 22 electrically connect the plurality of battery cells 12.

The plurality of battery cells 12 includes a plurality of first battery cells 12A arranged in a first row A, a plurality of second battery cells 12B arranged in a second row B adjacent to the first row A, a plurality of third battery cells 12C arranged in a third row C adjacent to the second row B, and a plurality of fourth battery cells 12D arranged in a fourth row D adjacent to the third row C. The plurality of first battery cells 12A and the plurality of second battery cells 12B are connected in series to each other in one-by-one pairs. Further, each of the first battery cells 12A has corresponding one of the plurality of third battery cells 12C connected in parallel, and each of the second battery cells 12B has corresponding one of the plurality of fourth battery cells 12D connected in parallel.

In the battery pack 210 of the present embodiment as well, each of the first lead plates 20 except for the first lead plates 20 (20X, 20Y) located at both ends has a first multi-row lead plate structure. That is, each of the first lead plates 20 extends over the first row A to the fourth row D, and is connected to a positive electrode of one of the plurality of first battery cells 12A, a negative electrode of one of the plurality of second battery cells 12B, a positive electrode of one of the plurality of third battery cells 12C, and a negative electrode of one of the plurality of fourth battery cells 12D.

In addition, each of the second lead plates 22 has a second multi-row lead plate structure. That is, each of the second lead plates 22 extends over the first row A to the fourth row D, and is connected to a negative electrode of one of the plurality of first battery cells 12A, a positive electrode of one of the plurality of second battery cells 12B, a negative electrode of one of the plurality of third battery cells 12C, and a positive electrode of one of the plurality of fourth battery cells 12D.

In the battery pack 210 of the third embodiment as well, any pairs of two battery cells 12 connected in parallel with each other are avoided from becoming adjacent to each other. For example, each first battery cell 12A is connected in parallel with its corresponding third battery cell 12C instead of the second battery cell 12B that is adjacent thereto. Similarly, each second battery cell 12B is connected in parallel with its corresponding fourth battery cell 12D instead of the first battery cell 12A or the third battery cell 12C adjacent thereto. Due to this, when a short circuit occurs in one of the battery cells 12, a corresponding battery cell 12 connected in parallel with this battery cell 12 is suppressed from being collaterally damaged.

A battery pack 310 of a fourth embodiment will be described with reference to FIGS. 13 and 14. Here, of a configuration of the battery pack 310 of the present embodiment, differences from the battery pack 10 of the first embodiment will primarily be explained. Unless otherwise stated in the description below, the respective configurations provided in the battery pack 10 of the first embodiment can selectively be employed in the battery pack 310 of the present embodiment.

Figure 13:
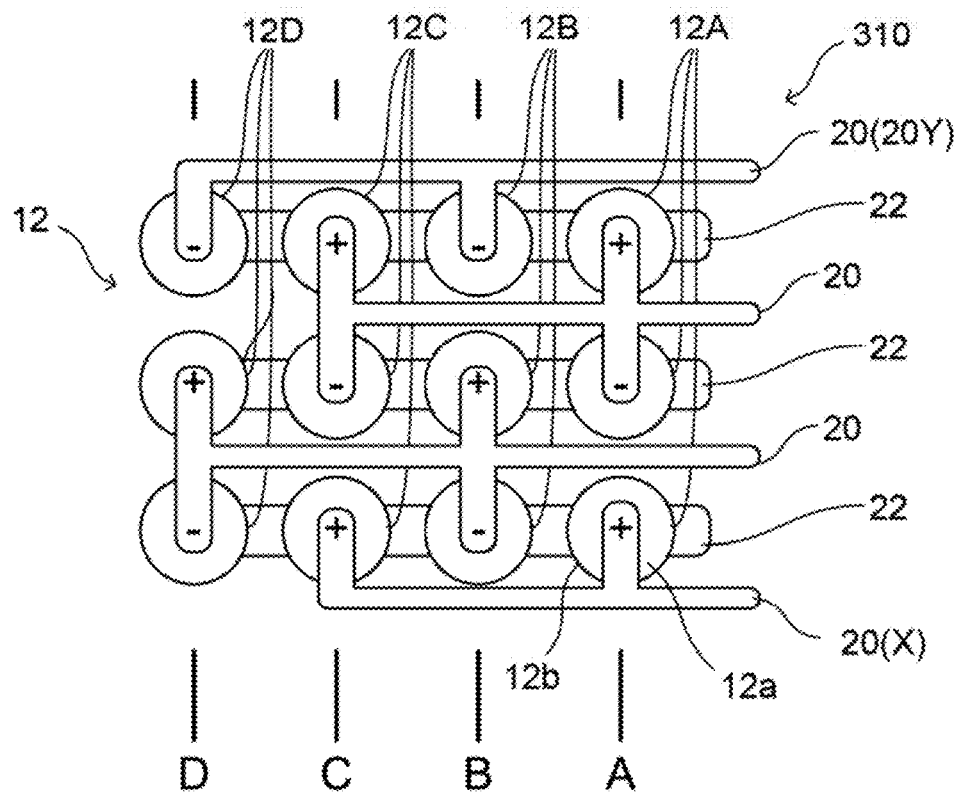
FIG. 13 schematically shows a configuration of a battery pack 310 of a fourth embodiment.
Figure 14:
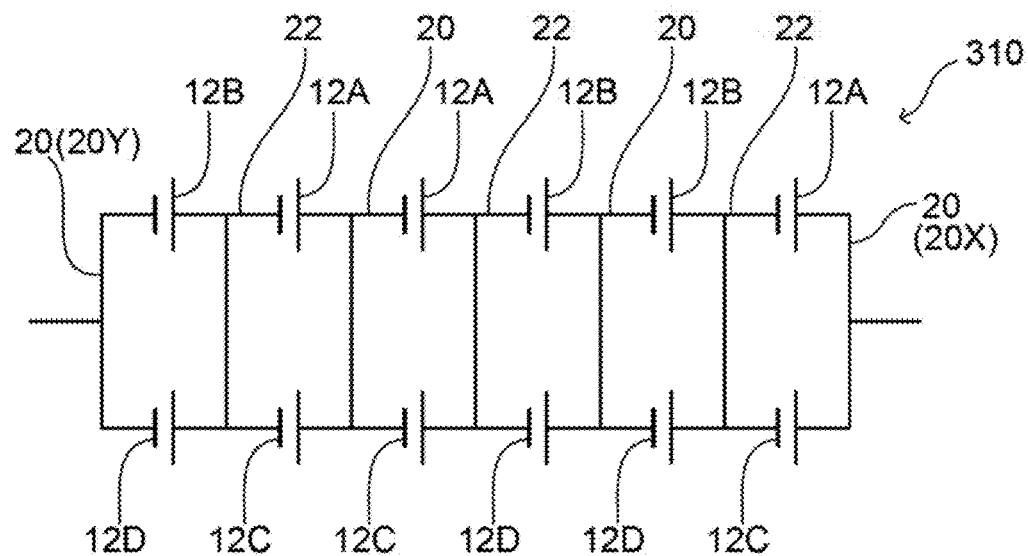
FIG. 14 is a circuit diagram showing an electrical connection configuration of a plurality of battery cells 12 of the battery pack 310 of the fourth embodiment.

As shown in FIGS. 13 and 14, the battery pack 310 of the present embodiment includes a plurality of battery cells 12. The plurality of battery cells 12 is supported parallel to each other, and each has a first end 12a facing a first plane and a second end 12b facing a second plane parallel to the first plane. Further, the battery pack 310 includes a plurality of first lead plates 20 arranged along the first plane and a plurality of second lead plates 22 arranged along the second plane. These plural lead plates 20, 22 electrically connect the plurality of battery cells 12.

The plurality of battery cells 12 includes a plurality of first battery cells 12A arranged in a first row A, a plurality of second battery cells 12B arranged in a second row B adjacent to the first row A, a plurality of third battery cells 12C arranged in a third row C adjacent to the second row B, and a plurality of fourth battery cells 12D arranged in a fourth row D adjacent to the third row C. The plurality of first battery cells 12A is arranged by being alternately oriented in opposite directions in the first row A. With the plurality of first battery cells 12A, positive electrodes and negative electrodes appear alternately as their first ends 12a arranged in the first row A. Similarly, the plurality of second battery cells 12B is arranged by being alternately oriented in opposite directions in the second row B, the plurality of third battery cells 12C is arranged by being alternately oriented in opposite directions in the third row C, and the plurality of fourth battery cells 12D is arranged by being alternately oriented in opposite directions in the fourth row D.

The plurality of first battery cells 12A and the plurality of second battery cells 12B are connected in series to each other in two-by-two pairs except for those located at both ends. Further, each of the first battery cells 12A has corresponding one of the plurality of third battery cells 12C connected in parallel thereto, and each of the second battery cells 12B has corresponding one of the plurality of fourth battery cells 12D connected in parallel thereto.

In the battery pack 310 of the present embodiment, one of the first lead plates 20 is connected to the first ends 12a of two first battery cells 12A adjacent to each other and the first ends 12a of two third battery cells 12C adjacent to each other. Further, another one of the first lead plates 20 is connected to the first ends 12a of two second battery cells 12B adjacent to each other and the first ends 12a of two fourth battery cells 12D adjacent to each other. That is, each of the first lead plates 20 does not have a first multi-row lead plate configuration as aforementioned.

On the other hand, each of the second lead plates 22 has a second multi-row lead plate structure, and extends over the first row A to the fourth row D. However, the second lead plate 22 located at a center is connected to one positive electrode among those of the plurality of first battery cells 12A, one negative electrode among those of the plurality of second battery cells 12B, one positive electrode among those of the plurality of third battery cells 12C, and one negative electrode among those of the plurality of fourth battery cells 12D. As for other second lead plates 22, each of them is connected to a negative electrode of one of the first battery cells 12A, a positive electrode of one of the second battery cells 12B, a negative electrode of one of the third battery cells 12C, and a positive electrode of one of the fourth battery cells 12D, similarly to the other embodiments.

In the battery pack 310 of the fourth embodiment as well, any pairs of two battery cells 12 connected in parallel with each other are avoided from becoming adjacent to each other. For example, each first battery cell 12A is connected in parallel with its corresponding third battery cell 12C instead of the second battery cell 12B that is adjacent thereto. Similarly, each second battery cell 12B is connected in parallel with its corresponding fourth battery cell 12D instead of the first battery cell 12A or the third battery cell 12C adjacent thereto. Due to this, when a short circuit occurs in one of the battery cells 12, a corresponding battery cell 12 connected in parallel with this battery cell 12 is suppressed from being collaterally damaged.

What is claimed is:

1. A battery pack comprising:
a plurality of battery cells supported parallel to each other, each battery cell comprising a first end facing a first plane and a second end facing a second plane parallel to the first plane, the plurality of battery cells including:
a plurality of first battery cells arranged in a first row, the plurality of first battery cells being connected in series;
a plurality of second battery cells arranged in a second row adjacent to the first row, the plurality of second battery cells being connected in series;
a plurality of third battery cells arranged in a third row adjacent to the second row, each of the plurality of first battery cells being connected in parallel with corresponding one of the plurality of third battery cells, the plurality of first battery cells and plurality of third battery cells being staggered such that they do not completely overlap in a direction perpendicular to a direction of the first row; and
a plurality of fourth battery cells arranged in a fourth row adjacent to the third row, each of the plurality of second battery cells being connected in parallel with corresponding one of the plurality of fourth battery cells;
a plurality of lead plates electrically connecting the plurality of battery cells, the plurality of lead plates including at least one first lead plate arranged along the first plane and at least one second lead plate arranged along the second plane.

2. The battery pack according to claim 1, wherein the plurality of first battery cells and the plurality of second battery cells are connected in series to each other in one-by-one pairs.

3. The battery pack according to claim 2, wherein
each of the plurality of first battery cells and the plurality of third battery cells comprises a positive electrode at the first end and a negative electrode at the second end, and
each of the plurality of second battery cells and the plurality of fourth battery cells comprises a negative electrode at the first end and a positive electrode at the second end.

4. The battery pack according to claim 3, wherein the at least one first lead plate includes a first multi-row lead plate connected to the positive electrode of one of the plurality of first battery cells, the negative electrode of one of the plurality of second battery cells, the positive electrode of one of the plurality of third battery cells, and the negative electrode of one of the plurality of fourth battery cells.

5. The battery pack according to claim 4, wherein
the at least one first lead plate includes a plurality of the first multi-row lead plates, and
the plurality of first multi-row lead plates is arranged in a direction parallel to the first row.

6. The battery pack according to claim 5, wherein the plurality of first multi-row lead plates has a same shape and is arranged in a same posture as each other.

7. The battery pack according to claim 4, wherein the at least one second lead plate includes a second multi-row lead plate connected to the negative electrode of one of the plurality of first battery cells, the positive electrode of one of the plurality of second battery cells, the negative electrode of one of the plurality of third battery cells, and the positive electrode of one of the plurality of fourth battery cells.

8. The battery pack according to claim 7, wherein
the at least one second lead plate includes a plurality of the second multi-row lead plates, and
the plurality of second multi-row lead plates is arranged in a direction parallel to the first row.

9. The battery pack according to claim 8, wherein the plurality of second multi-row lead plates has a same shape and is arranged in a same posture as each other.

10. The battery pack according to claim 9, wherein the shape of the second multi-row lead plate is different from the shape of the first multi-row lead plate.

11. The battery pack according to claim 1, wherein at least some of the plurality of first battery cells and at least some of the plurality of second battery cells are connected in series to each other in two-by-two pairs.

12. The battery pack according to claim 11, wherein
the plurality of first battery cells is alternately oriented in opposite directions in the first row, and
the plurality of third battery cells is alternately oriented in opposite directions in the third row.

13. The battery pack according to claim 12, wherein
the plurality of second battery cells is alternately oriented in opposite directions in the second row, and
the plurality of fourth battery cells is alternately oriented in opposite directions in the fourth row.

14. The battery pack according to claim 11, wherein the at least one first lead plate includes a lead plate connected to the first ends of adjacent two of the plurality of first battery cells and to the first ends of adjacent two of the plurality of third battery cells.

15. The battery pack according to claim 11, wherein the at least one first lead plate includes a lead plate connected to the first ends of adjacent two of the plurality of second battery cells and to the first ends of adjacent two of the plurality of fourth battery cells.

16. The battery pack according to claim 11, wherein the at least one second lead plate includes a lead plate connected to one of the plurality of first battery cells, one of the plurality of second battery cells, one of the plurality of third battery cells, and one of the plurality of fourth battery cells.

17. The battery pack according to claim 1, further comprising a battery holder securing the plurality of battery cells, the at least one first lead plate, and the at least one second lead plate to each other.

18. The battery pack according to claim 17, further comprising a housing accommodating the battery holder.

19. The battery pack according to claim 1, wherein corresponding one or more of the second battery cells are located between each pair of the first battery cell and the third battery cell connected in parallel with each other.

20. The battery pack according to claim 1, wherein corresponding one of the third battery cells is located between each pair of the second battery cell and the fourth battery cell connected in parallel with each other.

* * * * *